April 10, 1945.  B. ULINSKI  2,373,636
CONTROLLER
Filed Aug. 17, 1940  3 Sheets-Sheet 1
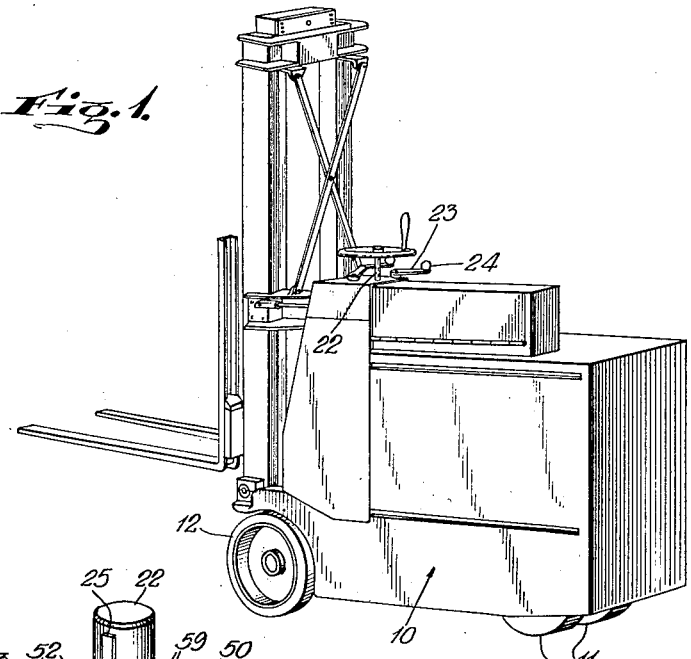
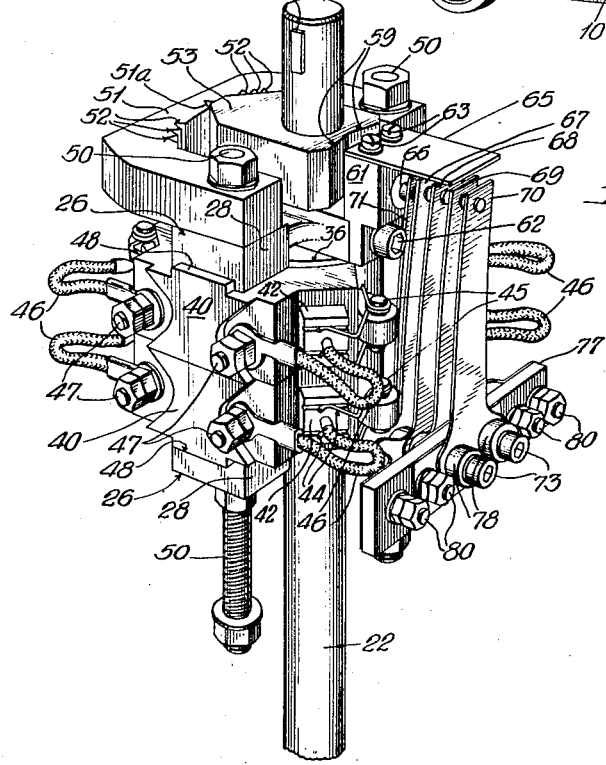
INVENTOR
BRONISLAUS ULINSKI
BY
ATTORNEY

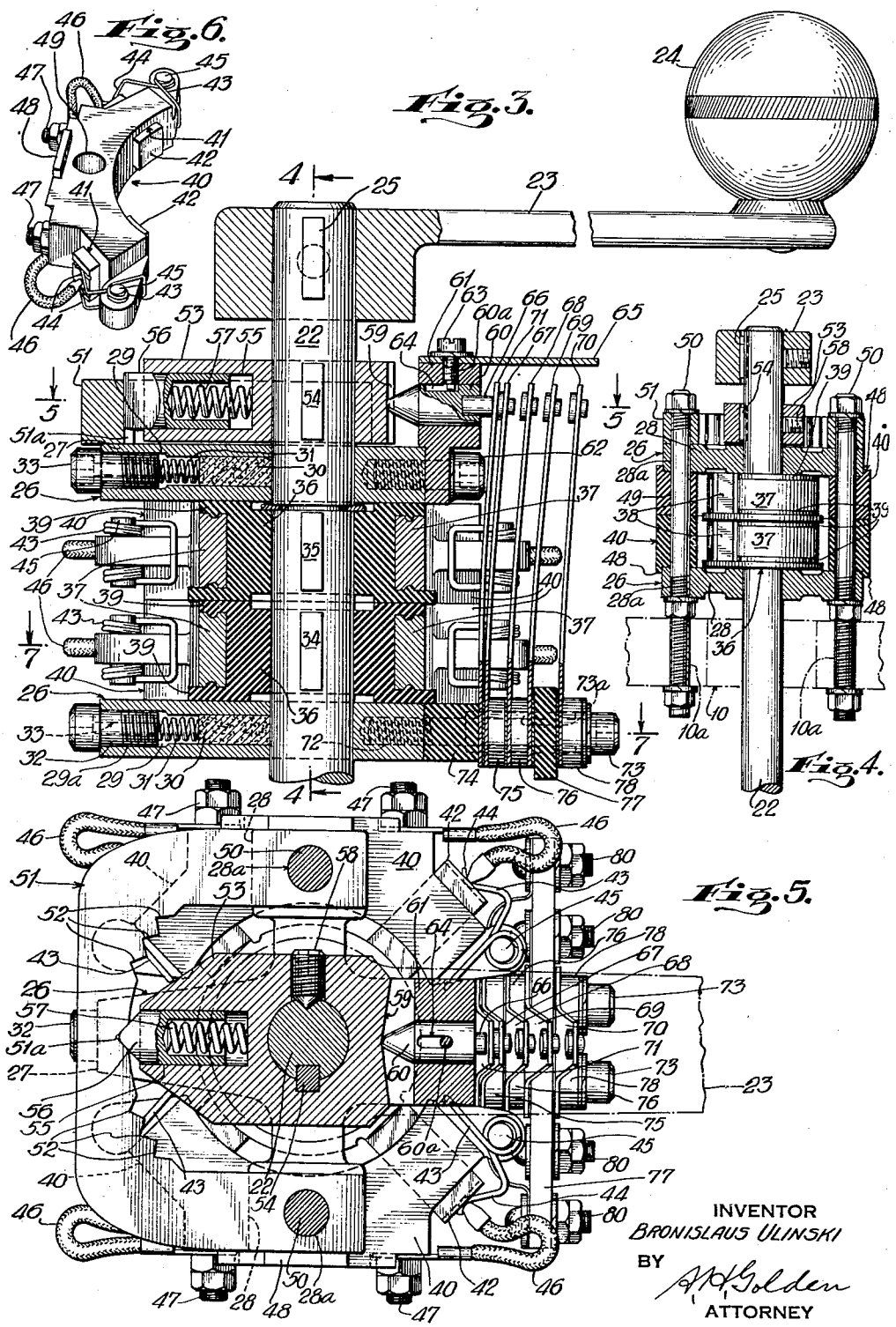

April 10, 1945. B. ULINSKI 2,373,636
CONTROLLER
Filed Aug. 17, 1940 3 Sheets-Sheet 3
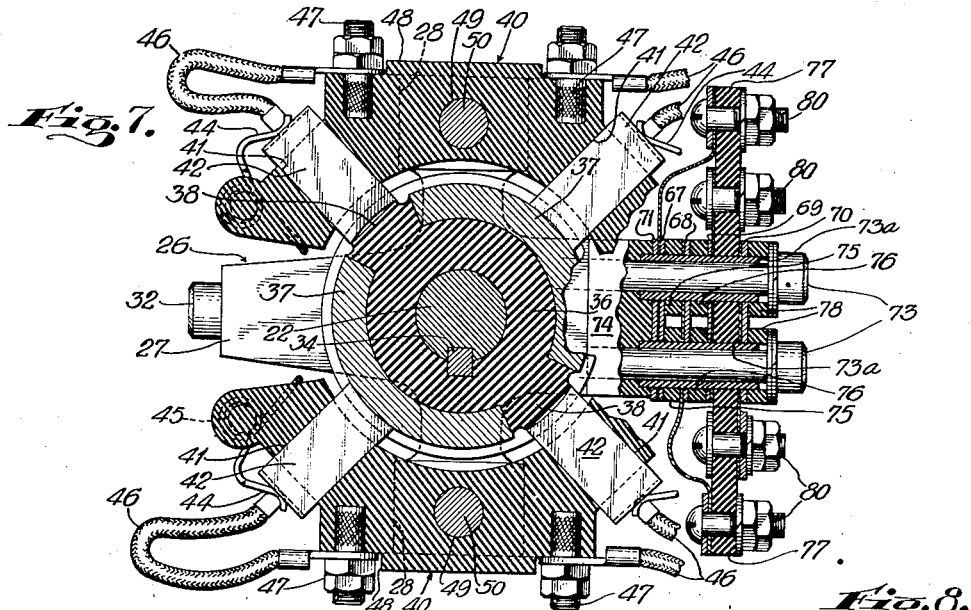
Fig. 7.
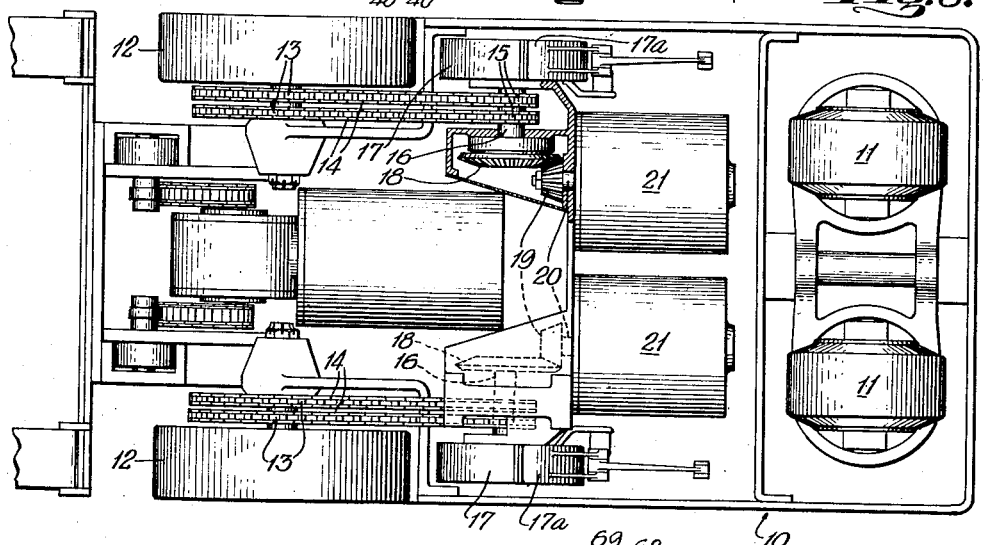
Fig. 8.
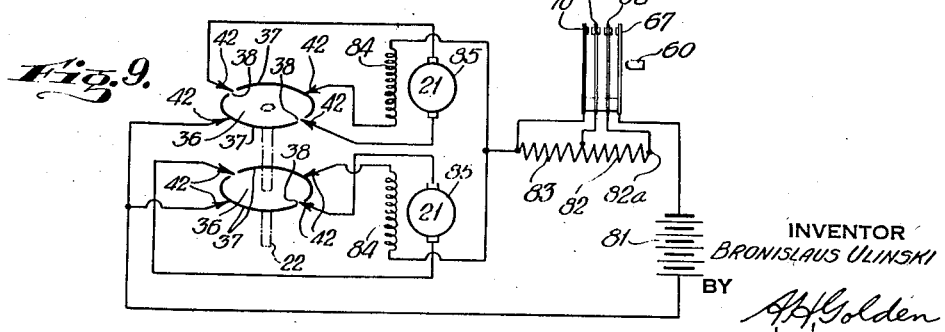
Fig. 9.
INVENTOR
BRONISLAUS ULINSKI
BY
ATTORNEY Patented Apr. 10, 1945

2,373,636

UNITED STATES PATENT OFFICE 2,373,636

CONTROLLER

Bronislaus Ulinski, Chicago, Ill., assignor to The Yale & Towne Manufacturing Company, Stamford, Conn., a corporation of Connecticut Application August 17, 1940, Serial No. 353,096

12 Claims. (Cl. 209—18)

This invention relates to a controller adapted for utilization in an industrial truck, and more particularly in an industrial truck having a plurality of traction motors. A feature of my new and novel controller is its ready adaptability for a considerable number of uses, it being shown in this application adapted for controlling a plurality of motor circuits.

In its preferred form, my controller comprises a rotating shaft on which may be mounted one or more contact members for simultaneous rotation by the shaft relatively to fixed contacts. The contacts rotatable with the shaft may be arranged so that one will control one motor, while another will control a second motor. As further illustrating the adaptability of my controller, the contacts rotatable with the shaft may be arranged so as to divide between them the current for a single motor, thereby reducing the amount of current carried by each rotatable contact member and the stationary contact members cooperable therewith. Those skilled in the art will appreciate that this makes it possible to use lighter and less costly contact elements.

As a further feature of my controller, it is particularly adapted for controlling the circuits of one or more motors in which resistances are to be short circuited one by one, preferably through means of contactors. Thus, it is a preferred feature of my controller that those contact elements rotatable with the shaft relatively to stationary contacts, are utilized for closing the directional circuit of a motor or motors to be controlled, in one or the other direction, and that continued rotation of the shaft, because of the particular arrangement of the contact elements, maintains the said circuit closed. This continued rotation of the shaft is utilized, however, to close first, and preferably, a contactor for the motor circuit, and thereafter for short circuiting out of the motor circuit the traction resistances contained therein. The continued rotation of the shaft may be used in other ways, of course. Thus, where a pair of motors are first connected in series, the continued rotation of the shaft may be utilized to close circuits to throw the motors into parallel.

More in detail, for the particular adaptation herein to be described, my controller comprises a main shaft carrying a pair of rotatable disks, one for each traction motor of the form of truck which I show in this application. Naturally, where there is but a single traction motor, there will be but one disk unless it is desired to divide the current between two disks. Each of the disks carries a pair of contact segments of considerable extent separated by insulation areas. By rotating the shaft in one direction, the contact segments cooperate with stationary contacts, preferably in the form of brushes, and direct the current in one direction through the traction motors, while rotation of the shaft in another direction will direct the current in a reverse direction through the motors, all as will be understood by those skilled in the art.

The considerable extent or length of the segments carried by each disk is utilized to maintain closed the particular directional circuit of each traction motor which is closed, while a cam carried by the shaft closes first, preferably, a contactor circuit for the main motor circuits. Further rotation of the shaft will preferably be utilized, as was previously indicated, to short out resistances in the traction circuits of the two motors, and possibly to place the motors in parallel if they have been started in series.

I have thus described generally the more important features of my invention in order that the scope and nature of my contribution to the art may be better understood. There are, of course, other features of my invention which I shall hereinafter describe and claim. While I shall now show and describe a particular preferred form of my invention, it should be understood that I deem myself entitled to patent claims which will prevent the utilization of my contribution in physical forms other than those described by me herein.

Referring now to the drawings, Fig. 1 shows in perspective a type of truck for which my controller is particularly adapted. Fig. 2 is a perspective view showing my controller assembly ready for mounting on a truck. Fig. 3 is a longitudinal section through the controller, while Fig. 4 is a section taken substantially along lines 4—4 of Fig. 3 with the section arranged to show the contact disks in elevation. Fig. 5 is a section taken along lines 5—5 of Fig. 3. Fig. 6 is a perspective view of one of the insulation pieces utilized for carrying the brushes. Fig. 7 is a section taken along lines 7—7 of Fig. 3. Fig. 8 is a view of the truck of Fig. 1, looking from the bottom of the truck upwardly and illustrating the mounting of the traction motors and traction wheels. Fig. 9 is a schematic view of a type of circuit in which my controller is adapted to function.

Referring now more particularly to the drawings, and especially to Figs. 1 and 8, reference numeral 10 designates a type of industrial truck with which my invention is particularly cooperable. Naturally, I shall describe only those parts of the truck which are particularly pertinent to my invention. Truck 10 may have the usual rear steering wheels 11 and the forward traction wheels 12, the traction wheels 12 each carrying a pair of sprockets 13 in driving engagement with a pair of chains 14. The chains 14 are driven by sprockets 15 mounted on shafts 16 suitably supported on the main frame of the truck 10. Each shaft 16 carries at one end a brake drum 17 with which are cooperable the usual type of brake shoes 17a for stopping the rotation of the shaft 16 when the power to the traction motors of the truck is shut off. Mounted at the other end of each of the shafts 16 is a beveled gear 18 in contact with a beveled pinion 19 secured at the end of the armature shaft 20 of the armature of the electric motor 21. It is now apparent from Figs. 1 and 8 that each of the traction wheels 12 of the truck 10 is separately adapted for driving by the armature of an electric motor 21, through the pinion 19, the gear 18, the sprockets 13 and 15, and the chains 14.

It will be further apparent to those skilled in the art that it becomes necessary to control the circuits of the two motors 21 simultaneously, so as to properly control the operation of those motors in the usual way understood by those skilled in the art. While my controller is adapted for utilization in many other types of installations, I have thought it best to describe it in the particular combination herein shown. Once the operation of my invention for controlling the operation of traction motors 21 is understood, its possibilities in other assemblies and for other purposes will be quite apparent to those skilled in this art.

Referring now more particularly to Figs. 2-7, inclusive, wherein my controller is illustrated, it will be noted that the main shaft thereof is designated by the reference numeral 22 and is adapted for rotation by a handle 23 having a knob 24, the handle 23 being keyed to the shaft 22 as at 25 in any desirable manner. The main shaft 22 rotates relatively to upper and lower indentically similar bearing plates 26, shown best in section in Figs. 3 and 4, and in plan in Figs 5 and 7. Referring especially to Figs. 5 and 7, each of the bearing plates 26 is shown as having three extending arms, one of these being designated by the reference manual 27, while the other two, being duplicates, are indicated by reference numeral 28.

As shown best in Fig. 3, each of the arms 27 of the bearing plates 26 is bored out as at 29 for the housing of a wick 30 which is maintained by a spring 31 against the main shaft 22. The spring 31 bears against a threaded retainer cap 32 which is threaded into a counterbored portion 29a of the bore 29. The cap 32 is drilled as at 33 whereby oil may be inserted into the bore 29 to be fed by the wick 30 to the shaft 22. In this way, the shaft 22 is maintained properly lubricated as is required, and as will be understood by those skilled in the art.

A pair of contact or segment carrying disks, preferably identical in every way, are keyed to the main shaft 22 at 34 and at 35. Each disk, which is designated generally by the reference numeral 36, is shown best in elevation in Fig. 4, and in section in Figs. 3 and 7. Each of the disks is formed of a suitable cast plastic insulation material of the type well known in this art, and has imbedded therein a pair of identical and opposed contact segments 37 which are separated by insulation areas 38 which are part of the main plastic cast portion of the disks 36. Moreover, each of the segments 37 is insulated at its top and bottom by overlying and underlying flanges 39 extending from the main cast body of the disks 36. It will of course be appreciated that the disks are formed by the flowing of the plastic material about the segments 37 which are placed in the mold in which the disks 36 are cast or formed.

For cooperating with the disks 36 and the segments 37, there are mounted opposite each of the disks 36 a pair of brush supports each carrying a pair of brushes. One of these brush supports is shown in perspective in Fig. 6, where it is designated by reference numeral 40. It is cast from a plastic insulation material and, as is best shown in Fig. 7, has square holes 41 in which are mounted for sliding movement suitable contact brushes 42 for cooperation with the segments 37.

Each of the brushes 42 is spring pressed toward a contact segment 37 by a coil spring 43 having a pair of spring arms 44, and secured on lugs 45 cast integrally with the body of the brush support 40. Each of the brushes 42 is in contact with a pig tail 46 extending to a suitable binding post 47. Formed integrally also with each of the brush supports 40 is a shoulder 48 which, as best shown in Fig. 2, extends over the flat end surface of the arm 28 of the main bearing plate 26 for maintaining the brush support against rotation relatively to the entire assembly. It is thought that even from the description thus far advanced, it can be seen just how the single form of brush support 40, and the single form of disk 37 are utilized in the assembly of my controller.

Each of the brush supports 40 is also drilled as at 49 for the passage of a main bolt 50, there being two of these bolts, one for each of the arms 28 of the main bearing plates 26. It can best be seen from Fig. 4 that the bolts 50 traverse the bores 28a in the arms 28 of the bearing plates 26, and the bores 49 of the brush supports 40, to maintain assembled the brush supports 40, the disks 36, the main shaft 22, and the bearing plates 26. In addition, the bolts 50 may be used to secure the controller assembly to the frame of the truck 10, by simply extending the bolts through suitable openings 10a formed in the main frame, all as is apparent in Fig. 4.

The bolts 50 function also to maintain assembled to the upper main bearing plate 26 a substantially U-shaped index bracket 51 having a central neutral notch 51a and a series of three speed notches 52 at each side of the central neutral notch 51a. Cooperating with the index bracket 51 is an indexing cam 53, shown best in Figs. 2, 3 and 5. This indexing cam is keyed as at 54 to the main shaft 22 for rotation therewith. It is bored out as at 55 for an indexing pin 56 which is spring pressed outwardly against the several notches 51a, 52 by a spring 57 whereby it functions to maintain the shaft 22 yieldingly in any position to which it is rotated relatively to the index bracket 51.

It may be well to indicate that in addition to the key 54, a screw 58 is used to secure the indexing cam 52 to the shaft 22 and against sliding movement relatively to that shaft, all as will be quite apparent to those skilled in the art. Also, the indexing cam 53 has a cam surface 59 cooperable with a plunger 60 maintained for sliding movement within a bracket 61. This bracket 61 is secured by a pair of parallel stud bolts 62 to the upper bearing plate 26, as is probably best illustrated in Fig. 3. The plunger 60 is limited in movement by a screw 60a operating within a slot 64 of the plunger 60. Screws 63 are utilized for securing to the bracket 61 a protecting plate 65, the function of which will become apparent hereinafter.

At this point it may be well to add that the plunger 60 carries a pin 66 formed of insulation material through which the plunger 60 is adapted to operate a spring finger contact 67 and further spring finger contacts 68, 69 and 70, as well as a leaf spring 71, all for a purpose to be explained more fully hereinafter.

The lower of the bearing plates 26 has bores 72 which are threaded for the entry of a pair of bolts 73. It will be important to indicate at this time that the threaded bores 72 are so spaced as to be available for either the threaded bolts 73 or for the bolts 62, which it will be remembered cooperate with the upper bearing plate 26 for securing to it the bracket 61. This further illustrates the manner in which my invention is adapted for economical manufacture and assembly.

The bolts 73 support relatively to the lower bearing plate 26 an insulation bar 74 and the insulation washers 75 and 76, as well as a further insulation bar 77 and further insulation washers 78. Between the washers 75 and the insulation bar 74 there are supported the leaf spring 71 and the first spring contact member 67. Between the washers 75 and 76 there is supported the second spring contact member 68. Between the washers 76 and the insulation bar 77 there is supported the spring contact finger 69. Between the washers 78 and the insulation bar 77 there is supported the spring contact finger 70, all as will be quite apparent. Also, as best seen in Fig. 7, surrounding the bolts 73 to insulate them from the spring contact fingers, are insulation sleeves 73a. The insulation bar 77 has mounted thereon the binding posts 80 for a purpose which will be quite clear to those skilled in the art, who will know that from certain of the binding posts 80 conductors run to the spring finger contact fingers, the motors 21 and the various contactors, all as may be required.

It will now be obvious to those skilled in the art that when the main shaft 22 of my controller is rotated by the handle 23 through the knob 24, either in a clockwise or a counterclockwise direction, the indexing cam 59 moves integrally therewith relatively to the plunger 60. The cam 59 will function when the indexing pin 56 reaches the first notch of either of the series of notches 52, to move the first of the spring contact fingers into contact with the second, and upon continued rotation, to bring all of the spring contact fingers into engagement, for the purpose to be hereinafter set forth.

For a better understanding of my invention, I shall now refer to the schematic drawing of a circuit in which my controller is operable, and which is shown in Fig. 9. I should like to point out at this time that in Fig. 9 I will show the spring finger contacts 67—70 actually within the traction circuit, rather than operative through contactors as is the commercial practice. In other words, instead of illustrating the pair of spring fingers 69 and 70 as closing a circuit through an electric relay which in turn shorts out a part of the traction resistance, I have shown the spring finger contact members 69 and 70 as themselves directly within the traction circuit. While this shortens the description and drawings, the operation of my invention is even more easily understood than were I to go into the detail which would otherwise be required.

In the schematic diagram of Fig. 9, the parts are illustrated in their positions shown in the remaining figures, that is, with all circuits open, and with the disks 36 in the neutral position of Fig. 7 relatively to the brushes 42, the brushes 42 being shown by arrows in Fig. 9. A suitable source of current is designated by the battery 81, while portions of the traction resistances are designated by reference numerals 82 and 83. The field coil of each of the motors 21 is designated by reference numeral 84, while the armatures are numbered 85.

Should the main shaft 22 be now rotated in either a right hand or a left hand direction, each of the segments 37 will move into contact with two of the brushes 42, the insulation areas 38 moving away from two of the brushes 42, all as is quite apparent. However, the traction circuit will remain open, due to the separation of the spring contact fingers 67 and 68. It is not until the shaft 22 has moved a sufficient distance to bring the indexing pin 56 into the first of the notches of either series of notches 52 of index bracket 51, that the plunger 60 will have moved sufficiently to bring spring fingers 67 and 68 into contact. At this point a circuit will be closed from the battery 81 through the spring fingers 67 and 68 to the terminal 82a of the traction resistance 82, through the traction resistances 82 and 83, and thence in parallel through each of the field coils 84, brushes 42, contact segments 37, the armatures 85, brushes 42, segments 37, brushes 42, and back to the battery 81. Those skilled in the art will appreciate that in commercial practice, the contactors operated by the bringing together of spring fingers 67 and 68 will accept the arcing, incidental to the first closing of the motor circuits.

Continued rotation of the shaft 22 will merely move the segments 37 relatively to the brushes 42, while maintaining closed the directional circuits between the segments 37 and the brushes 42, all as will be quite apparent. At the same time the plunger 60 will be moved so that it will bring the three spring contact fingers 67, 68 and 69 together whereby to short out the resistance 82. Further movement of the plunger 60 incidental to the rotation of the shaft 22 will bring all four of the spring fingers together, shorting out the resistance 83. Thus, regardless of the rotation of the shaft 22, the functioning of the spring fingers 67—70 will be exactly the same. The motors 21 may therefore be controlled for rotation in either direction in a very simple manner, by the rotation of shaft 22 in a corresponding direction.

As I have already explained generally, it is now quite clear that through my controller, one or more motors, such as the motors 21 of the truck of Fig. 8, may be controlled in any way desired. Thus, I must reiterate it is possible by providing the proper circuits, to first place the motors 21 in series, while utilizing a contactor operated by spring finger contacts 69 and 70, to throw the motors into parallel. Naturally, also, such interlocks and timers as may be required to control the controller operation, may be utilized without affecting the operation of my controller. Moreover, it is readily discernible that should a single traction motor be utilized, but for a very heavy duty truck, that motor may require more current than may be handled by a single one of the disks 36 and two pairs of brushes 42. In such a case, a series of disks 36 may be utilized for dividing the current which must flow through the motor, all as is possible through a proper arrangement of the conductors leading to and from the several binding posts of my controller.

Having thus clarified the operation and adaptability of my invention, I now claim:

1. In a controller of the class described, a rotatable shaft, means mounting said shaft for rotation, a contact making device secured on said shaft for rotation therewith, stationary contact means engageable with said device as it rotates with said shaft, a series of normally spaced contact members, and means rotatable with said shaft for moving said members sequentially into contact and for maintaining said members in contact as said shaft rotates, said contact making device being of sufficient angular extent to remain engaged with said stationary contact means as said shaft brings said spaced contact members into contact.

2. In a controller of the class described, a rotatable shaft, a contact making device secured secured on said shaft for rotation therewith, stationary contact means cooperable with said device as it rotates with said shaft to close a circuit and to maintain said circuit closed as said shaft rotates a predetermined degree, a series of normally spaced contact members, and means rotatable with said shaft for moving said members sequentially into contact as said shaft rotates said predetermined degree, whereby said contact fingers close control circuits for said first circuit.

3. In a controller of the class described, a rotatable shaft, a pair of contact making devices fixed on said shaft in angularly spaced relation relatively to a neutral space therebetween, stationary contacts cooperable with said devices when said shaft rotates in one or the other direction for closing one or the other of two directional circuits, a series of spaced contact fingers, and means rotatable with said shaft for moving said fingers into contact with one another, and for holding said fingers in contact as said shaft rotates in either of said directions.

4. In a controller of the class described, a rotatable shaft, a pair of contact making devices fixed on said shaft in angularly spaced relation relatively to a neutral space therebetween, stationary contacts cooperable with said devices when said shaft rotates in one or the other direction for closing one or the other of two directional circuits and to maintain said directional circuits closed as said shaft rotates a predetermined degree, a series of spaced contact fingers, and means rotatable with said shaft for moving said fingers sequentially into contact with one another as said shaft rotates in either of said directions said predetermined degree, whereby said contact fingers close control circuits for said directional circuits.

5. In a controller of the class described, a rotatable shaft, a disk fixed to said shaft and having formed thereon two contact segments separated by insulation material, stationary brushes relatively to which said disk moves in opposite directions whereby to bring said segments into contact with said brushes, said segments closing with said brushes one or the other of two directional circuits depending on the direction of rotation of said disk and shaft, a series of spaced contact fingers, and means rotatable with said shaft for moving said fingers sequentially into contact with one another, and for holding said fingers in contact as said shaft rotates in either of said directions.

6. In a controller of the class described, a rotatable shaft, a contact making device secured on said shaft for rotation therewith, stationary contact means cooperable with said device as it rotates with said shaft to close a circuit and to maintain said circuit closed as said shaft rotates a predetermined degree, a series of spaced contacts for closing control circuits for said electric circuit, and means rotatable with said shaft for moving said contacts to close said control circuits as said shaft rotates said predetermined degree.

7. In a controller of the class described, a rotatable shaft, a pair of contact making devices fixed on said shaft in angularly spaced relation relatively to a neutral space therebetween, stationary contacts cooperable with said devices when said shaft rotates in one or the other direction for closing one or the other of two directional circuits and to maintain said directional circuits closed as said shaft rotates a predetermined degree, a series of spaced contacts for closing control circuits for said directional circuits, and means rotatable with said shaft for moving said contacts sequentially to close said control circuits sequentially as said shaft rotates said predetermined degree in either of said directions.

8. In a controller of the class described, a mounting member, a rotatable shaft rotatable relatively to said mounting member, a contact disk fixed on said shaft for rotation therewith, a stationary contact brush carried on said mounting member for contacting said disk as said disk rotates with said shaft relatively to said brush, a cam secured on said shaft, a series of spaced contact fingers on said mounting member, a pin adapted for movement by said cam and slidable on said mounting member towards said contact fingers, the rotation of said shaft moving said cam whereby to slide said pin on said mounting member and against said contact fingers to move said fingers sequentially into contact with one another.

9. In a controller of the class described, a rotatable shaft, a series of duplicate disks fixed in superimposed like positions on said shaft for rotation therewith, each disk having formed thereon opposed contact segments separated from one another by insulation material, stationary brushes relatively to which said disks rotate with said shaft in opposite directions whereby to bring said segments into contact with said brushes to close opposite directional circuits, said segments being of such extent as to allow substantial continued rotation of said shaft while said segments remain in contact with said brushes, a series of additional contacts normally maintained separated and adapted to close control circuits for said directional circuits, and means rotatable with said shaft when it rotates in either of said directions for moving said contacts to close said control circuits sequentially during said substantial continued rotation of said shaft.

10. A controller for a pair of motors comprising a shaft, a pair of duplicate disks fixed in superimposed like positions on said shaft for rotation therewith, each disk having formed thereon opposed contact segments separated from one another by insulation material, stationary brushes relatively to which said disks rotate with said shaft in opposite directions whereby to bring said segments into contact with said brushes to close opposite directional circuits for both said motors simultaneously, said segments being of such extent as to allow substantial continued rotation of said shaft while said segments remain in contact with said brushes, a series of additional contacts normally maintained separated and movable toward one another, and means rotatable with said shaft for moving said contacts sequentially toward one another during said substantial continued rotation of said shaft in either of said opposite directions.

11. In a controller of the class described, upper and lower bearing plates, a shaft rotatable in said bearing plates, a plurality of brush holders of insulation material positioned between said bearing plates, bolts passing through holes in said upper and lower bearing plates and bores in said brush holders to secure said plates and holders in assembled relation, disks of insulation material keyed on said shaft between said upper and lower bearing plates and rotatable with said shaft relatively to said brush holders, conductor segments mounted in said disks to form a part thereof, brushes mounted for movement on said brush holders, springs pressing said brushes against said disk and segments, a series of normally separated spring contact fingers, a cam fixed to said shaft, and means whereby said cam moves said fingers sequentially into contact with one another as said shaft rotates said disks relatively to said brushes in either of said opposite directions.

12. In a controller of the class described, a rotatable shaft, a support member for mounting said shaft for rotation, a pair of contact making segments, means mounting said segments on said shaft for rotation therewith, means insulating said segments from said shaft and from one another, stationary contacts adapted to make contact with one of said segments when said shaft is rotated in one direction and adapted to make contact with the other of said segments when said shaft is rotated in the opposite direction, a series of normally separated contact devices spaced from said shaft, and means on said shaft for bringing said contact devices into engagement in predetermined sequence when said shaft rotates in either of said directions to bring said segments into engagement with said stationary contacts.

BRONISLAUS ULINSKI.